United States Patent
Maack (10) Patent No.: US 9,412,333 B2
(45) Date of Patent: Aug. 9, 2016

(54) ADAPTING AN X-RAY SLAVE IMAGE TO AN X-RAY MASTER IMAGE

(75) Inventor: Hanns-Ingo Maack, Norderstedt (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 48 days.

(21) Appl. No.: 14/344,625

(22) PCT Filed: Sep. 13, 2012

(86) PCT No.: PCT/IB2012/054769
§ 371 (c)(1),
(2), (4) Date: Mar. 13, 2014

(87) PCT Pub. No.: WO2013/042018
PCT Pub. Date: Mar. 28, 2013

(65) Prior Publication Data
US 2015/0015601 A1    Jan. 15, 2015

Related U.S. Application Data

(60) Provisional application No. 61/536,105, filed on Sep. 19, 2011.

(51) Int. Cl.
*G09G 5/02* (2006.01)
*G06T 5/40* (2006.01)

(52) U.S. Cl.
CPC .. *G09G 5/02* (2013.01); *G06T 5/40* (2013.01); *G06T 2207/10116* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 5,793,886 A | * | 8/1998 | Cok | 382/169 |
| 5,923,775 A | | 7/1999 | Snyder et al. | |
| 6,584,216 B1 | * | 6/2003 | Nyul et al. | 382/131 |
| 7,130,463 B1 | * | 10/2006 | Spangler | 382/168 |
| 2007/0052716 A1 | | 3/2007 | Jabri et al. | |
| 2007/0127795 A1 | | 6/2007 | Lau et al. | |

(Continued)

FOREIGN PATENT DOCUMENTS

| | | |
|---|---|---|
| EP | 1887487 | 2/2008 |
| IN | 200902278-14 | 3/2011 |

(Continued)

OTHER PUBLICATIONS

F. Zohrer, et al., "Interactive Multi-Contrast Enhancement of Previously Processed Digital Mammograms", Digital Mammography, 10th International Workshop, IWDM 2010, Girona, Catalonia, Spain, Jun. 16-18, 2010, Proceedings, pp. 31-39.

*Primary Examiner* — Phi Hoang (57) ABSTRACT

A device 16 for displaying X-ray images, the device comprises a display 20 for displaying an X-ray image, a workstation 22 for processing image data and a user interface 24 for receiving commands from a user of the device. The user interface 24 is adapted for allowing the user to select a master image 34a and a slave image 34b from a plurality of images. The workstation 22 is adapted for transforming the slave image 34b by generating a color transformation 40 based on the master image 34a and the slave image 34b for optically adapting the slave image to the master image and by applying the color transformation 40 to the slave image 34b. The display 20 is adapted for displaying the transformed slave image 42.

8 Claims, 10 Drawing Sheets

(56) References Cited

U.S. PATENT DOCUMENTS

2011/0262019 A1* 10/2011 Shen et al. .............. 382/131
2012/0081579 A1* 4/2012 Doepke ............ H04N 5/2355
                                                    348/231.99

FOREIGN PATENT DOCUMENTS

| WO | WO2005050563 | 6/2005 |
| WO | WO2010020921 | 2/2010 |

* cited by examiner

ADAPTING AN X-RAY SLAVE IMAGE TO AN X-RAY MASTER IMAGE

CROSS-REFERENCE TO PRIOR APPLICATIONS

This application is the U.S. National Phase application under 35 U.S.C. §371 of International Application Ser. No. PCT/IB2012/054769, filed on Sep. 13, 2012, which claims the benefit of U.S. application Ser. No. 61/536,105, filed on Sep. 19, 2011. These applications are hereby incorporated by reference herein.

FIELD OF THE INVENTION

The invention relates to a device for displaying X-ray images and to a method, computer program and computer readable medium for optically adapting an X-ray slave image to an X-ray master image.

BACKGROUND OF THE INVENTION

In radiology, x-ray images are often viewed by the radiologists in pairs: an older image may be presented together with a newer image. Often, the newer and older images are acquired with different X-ray devices (modalities) and look quite different. In this case, the radiologist may have the task either "to look through" the modality dependent differences or to modify one of the images interactively as good as possible. Some differences always remain. In general, two separate systems are involved of generating X-ray images and displaying them to the radiologist. The first is the acquisition workstation AWS. Here, the images are processed and manipulated for optimal display. One step in this process is the ranging of the images. Here, the different histogram properties of images with different exposure settings or patient thickness are modified (semi and auto mode). The second modality is the diagnostic workstation. The general rule is to present the images here in a reproducible standardized way to the radiologist. Tools to modify brightness and contrast of the images are available for interactive use. In case, two images of the same patient but different modalities are presented, the appearance of the images might differ very much. A more similar viewing impression may be achieved only by interactive modifications of at least one of the images.

Furthermore, many X-ray devices are adapted for modifying brightness and contrast of images before displaying them. With some X-ray devices an interactive image adaptation process may be performed. With these devices, all adaptation is done manually with mouse actions on each image separately to achieve a closer match between two images. As a rule, the images are presented separately from each other.

Some X-ray devices are adapted for performing a so called "semi mode" and/or "auto mode".

In the semi mode, from an image one relevant histogram key value is derived. For example, for a chest image it may be the average signal within the lungs. Then a look-up table may be generated that maps this key value to a preferred grey-value on the monitor or the printed film. The other parameters of the mapping curve may be pre-defined, such as the "contrast". In a chest image the shown grey-value of a bright pixel in the abdomen will vary around a typical value for slim and heavy patients. The simplest definition of the key value may be a specific percentile value of the histogram.

In the auto mode, two key values are derived from the histogram of an image. One represents a dark part of the image (such as the lungs) and another one a bright part, such as the abdomen. The look-up table may be generated in a way that two pre-define grey-values are matched at the end, a proper one for each key value. This may lead to a more stable image display also with strongly varying histograms of slim and heavy patients. The simplest definition of the two key values may be a low and high percentiles value of the histogram.

Normally, images are modified separately from each other, for example see WO 2010/020921 A2.

In "Interactive Multi-contrast Enhancement of Previously Processed Digital Mammograms" (International Workshop on Digital Mammography, Jun. 16-18, 2010, Girona, Spain; Fabian Zöhrer et al., ISBN 978-3-642-13665-8) a method is described in which two histograms of two images are mapped for adapting one of the images to the other.

SUMMARY OF THE INVENTION

It may be an object of the invention to provide a device which simplifies the work of a radiologist comparing two X-ray images.

This object may be achieved by the subject-matter of the independent claims. Further exemplary embodiments are evident from the dependent claims and the following description.

An aspect of the invention relates to a device for displaying X-ray images. For example, the device may be a diagnostic workstation connected to a database storing X-ray images that may have been acquired by different X-ray imaging devices.

According to an embodiment of the invention, the device comprises a display for displaying an X-ray image, a workstation for processing image data, and a user interface for receiving commands from a user of the device. The user interface is adapted for allowing the user to select a master image and a slave image from a plurality of images, for example stored in the workstation or in a database. The workstation is adapted for transforming the slave image by generating a color transformation based on the master image and the slave image for optically adapting the slave image to the master image and by applying the color transformation to the slave image. The display is adapted for displaying the transformed slave image.

In other words, a user may select two X-ray images and may define one of the images as a master image, which color format should be copied to the other image. The workstation automatically may generate a color transformation which maps the color format of the master image to the other image. After that the transformed image may be displayed, for example together with the master image.

The idea here may be to define the better of the two images as "master" and provide a function that copies the ranging to a slave image just by pressing a button. For this purpose the ranging methods that are so far only used in the above mentioned AWS have to be modified and implemented in the diagnostic workstation as well.

This may result in an improved workflow for the reading of images at a diagnostic workstation with a closer similarity of image pairs.

A further aspect of the invention is a method for optically adapting an X-ray slave image to an X-ray master image, which may be performed with the above mentioned device.

According to an embodiment of the invention, the method comprises the steps of: Receiving the master image and the slave image selected by a user; automatically generating a color transformation based on the master image and the slave image; applying the color transformation to the slave image for optically adapting the slave image to the master image and displaying the transformed slave image.

It has to be understood that features of the method as described in the above and in the following may be features of the device as described in the above and in the following.

Further aspects of the invention relate a computer program which adapted to carry out the steps of the method and a computer readable medium for storing such a computer program.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

In principle, identical parts are provided with the same reference symbols in the figures.

DETAILED DESCRIPTION OF EMBODIMENTS

Figure 1:
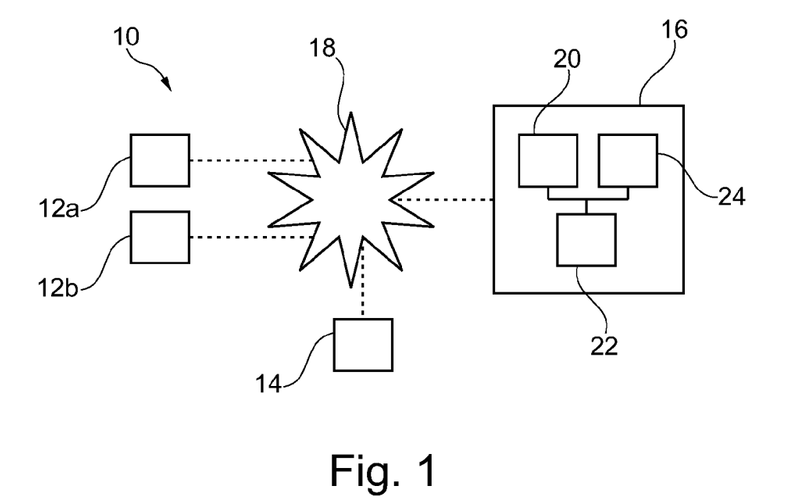
FIG. 1 shows a system with a diagnostic device according to an embodiment of the invention.

FIG. 1 shows a system 10 that may be implemented in a hospital that comprises at least two X-ray imaging devices 12a, 12b that may be of different types or vendors, a database 14 for storing X-ray images from the X-ray imaging devices 12 and a diagnostic device 16 for displaying X-ray images. The devices 12a, 12b, 14, 16 may be connected via a data network, for example a PACS network 18.

The database 14 may be any device adapted for storing a plurality of X-ray images in digital form.

The diagnostic device 16, which may be located in a special room in which a radiologist (a user) can evaluate the images in the database 14, comprises a display 20 for displaying X-ray images, a diagnostic workstation 22 for processing image data and commands form the user and a user interface 24, in which the user may input commands. The diagnostic workstation 22 may comprise a computer. The user interface 24 may comprise a computer mouse and a keyboard. Usually, the display may comprise more than one monitor.

According to an embodiment of the invention, the device 16 comprises a display 20 for displaying an X-ray image, a workstation 22 for processing image data and a user interface 24 for receiving commands from a user of the device.

Figure 2:
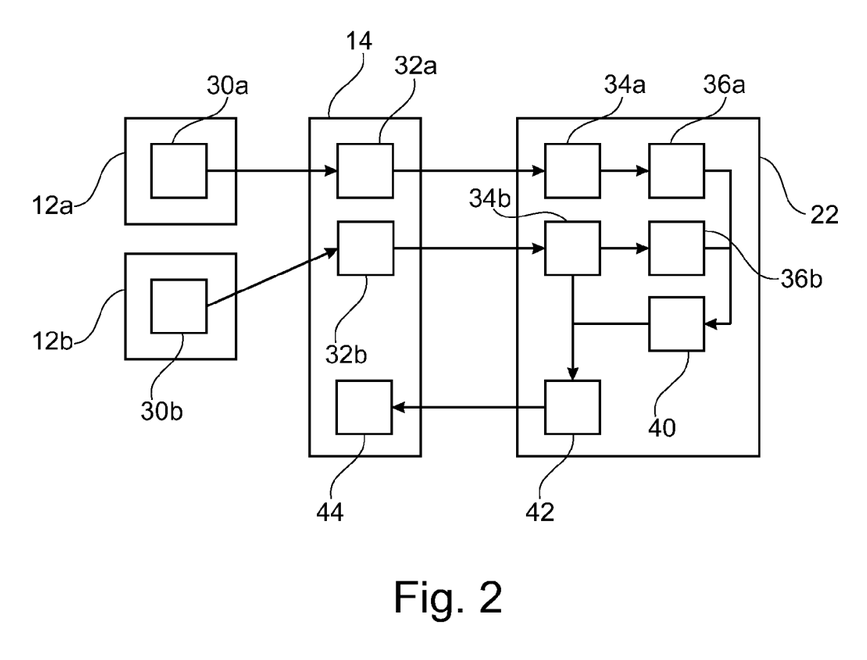
FIG. 2 shows data flows and data types in system 10 according to an embodiment of the invention.

FIG. 2 shows a data flow and data types in the system 10. An x-ray image 30a is acquired with the X-ray imaging device 12a, transported over the network 18 and stored in the database 14 as image data 32a. Later, for example more than one year later, an x-ray image 30b is acquired with the X-ray imaging device 12b, transported over the network 18 and stored in the database 14, as image data 32b.

When evaluating and comparing the images, a user may command the workstation 22 to load both images as images for representation, which are then retrieved over the network 18, and to define one of the images as master image 34a and the other image as slave image 34b.

The workstation 22 then automatically generates a master histogram 36a from the master image 34a, a slave histogram 36b from the slave image 34b. Based on the two histograms 36, 36b, the workstation creates a color transformation 40 in the form of a look-up table 40, as will be explained in more detail with respect to FIG. 3.

The workstation 22 then applies the color transformation 40 to the slave image 40 and generates a transformed image 42 that may be displayed on the display 20. The transformed image 42 also may be stored as image data 44 in the database 14.

According to an embodiment of the invention, the user interface 24 is adapted for allowing the user to select a master image 34a and a slave image 34b from a plurality of images.

According to an embodiment of the invention, the workstation 22 is adapted for transforming the slave image 34b by generating a color transformation 40 based on the master image 34a and the slave image 34b for optically adapting the slave image to the master image and for applying the color transformation 40 to the slave image 34b.

According to an embodiment of the invention, the display 20 is adapted for displaying the transformed slave image 42.

Figure 3:
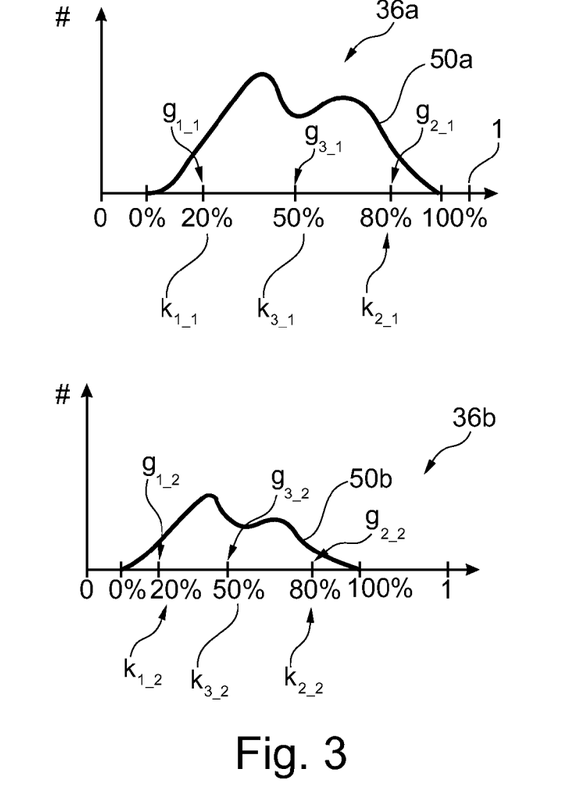
FIG. 3 shows two histograms from which a color transformation is calculated according to an embodiment of the invention.

FIG. 3 shows two histograms 36a, 36b from which a color transformation 40 is automatically calculated by the workstation 22. The histograms show a curve 50a, 50b which indicates the number of pixels (y axis) at a specific color value (x axis) of the respective image 34a, 34b. For example, the images 34a, 34b are grey-scale images and the color value may range between 0 (black) and 1 (white). The two images have different distribution of color values which is reflected in the different form of the curves 50a, 50b.

For calculating the color transformation 40, the workstation 22 determines different quantiles of the histograms 50a, 50b, for example 0% percentile (the lowest color value which is presented in the respective image 34a, 34b) and 100% percentile (the highest color value which is presented in the respective image 34a, 34b). Furthermore, the workstation determines key values $k_{1\_1}$, $k_{2\_1}$, $k_{1\_2}$, $k_{2\_2}$ from the histograms, in particular two master key values $k_{1\_1}$, $k_{2\_1}$ for the master image 34a and two slave key values $k_{1\_2}$, $k_{2\_2}$ for the slave image 34a. The key values $k_{1\_1}$ and $k_{1\_2}$ may be 20% percentile of the respective histogram 36a, 36b and the key values $k_{2\_1}$ and $k2_{\_\_}$ may be 80% percentile of the respective histogram 36a, 36b.

From the key values $k_{1\_1}$, $k_{2\_1}$, $k_{1\_2}$, $k_{2\_2}$ the workstation determines color values $g_{1\_1}$, $g_{2\_1}$, $g_{1\_2}$, $g_{2\_2}$. Although the color values $g_{1\_1}$, $g_{2\_1}$, $g_{1\_2}$, $g_{2\_2}$ are indicated in FIG. 3 these values may not be read from FIG. 3, but may be read from a further table.

The color value $g_{1\_1}$ is the grey scale value at $k_{1\_1}$ and the color value $g_{2\_1}$ is the grey scale value at $k_{2\_1}$ from the master image 34a. The color value $g_{1\_2}$ is the grey scale value at $k_{1\_2}$ and the color value $g_{2\_2}$ is the grey scale value at $k_{2\_2}$ from the master image 34a. The color values $g_{1\_1}$, $g_{2\_1}$, $g_{1\_2}$, $g_{2\_2}$ may be different.

From the color values $g_{1\_1}$, $g_{2\_1}$, $g_{1\_2}$, $g_{2\_2}$ a color transformation 40 in the form of a look-up table (LUT) 40 is generated by the workstation 22. The color transformation 40 may be a linear transformation with the properties that $g_{1\_1}$=LUT$[g_{1\_2}]$ and $g_{2\_1}$=LUT$[g_{2\_2}]$, in such a way, the color values $g_{1\_2}$, $g_{2\_2}$ of the slave image 34b are mapped to the respective color values $g_{1\_1}$, $g_{2\_1}$ of the master image.

Different algorithms for calculating or generating color transformations 40 may be stored in the workstation 22.

As a first example ("linear mapping"), as already explained, the color transformation (LUT) 40 may be defined as a linear curve. In this case the resulting image transformation from the salve image 34b to the image 42 may be seen equivalent to a windowing using the usual "window width" (interval between 0% and 100%) and "window level" (the center of the interval) parameters, however with parameters automatically calculated by the workstation from another image 34a.

As a second example ("S-shaped mapping"), the color transformation (LUT) 40 may be defined as an S-shaped curve, which may result in a stronger similarity of the images 34a, 42. In this case, at least three key values may be necessary. For example, two further key values $k_{3\_1}$, $k_{3\_1}$ may be derived from the histograms (for example 50% percentile) and the color transformation 40 may be defined that the color values at the key values $k_{3\_1}$, $k_{3\_1}$ are mapped. In between the color transformation may be linearly or may be an S-shaped best fit curve.

As a third example ("sophisticated mapping"), the color (and the image) transformation may be done in a more sophisticated manner. For example, such a transformation is described in Zohrer et al. (see above).

According to an embodiment of the invention, the color transformation 40 is a pixel wise transformation.

According to an embodiment of the invention, the color transformation 40 is a grey scale transformation According to an embodiment of the invention, the workstation is adapted to generate the color transformation by: identifying at least one master color value $g_{1\_1}$, $g_{2\_1}$ in the master image 34a, identifying at least one slave color value $g_{1\_2}$, $g_{2\_2}$ in the slave image (34b); and generating the color transformation 40 such that the at least one slave color value $g_{1\_2}$, $g_{2\_2}$ is mapped to the at least one master color value $g_{1\_1}$, $g_{2\_1}$.

According to an embodiment of the invention, the workstation 22 is adapted to generate the color transformation 40 by: generating master image histogram data 36a from color information of the master image 34a; identifying the least one master color value $g_{1\_1}$, $g_{2\_1}$ by identifying at least one master key value $k_{1\_1}$, $k_{2\_1}$ in the master image histogram data 36a; generating slave image histogram data 36b from color information of the slave image 34b; identifying the at least one slave color value $g_{1\_2}$, $g_{2\_2}$ by identifying at least one slave key value $k_{1\_2}$, $k_{2\_2}$ in the slave image histogram data 36b.

According to an embodiment of the invention, each master key value $k_{1\_1}$, $k_{2\_1}$ is a quantile of the master histogram data 36a and each slave key value $k_{1\_2}$, $k_{2\_2}$ is a corresponding quantile of the slave histogram data 36b.

According to an embodiment of the invention, two master color values $g_{1\_1}$, $g_{2\_1}$ and two slave color values $g_{1\_2}$, $g_{2\_2}$ are identified. The color transformations 40 may be a linear transformation.

According to an embodiment of the invention, at least three master color values $g_{1\_1}$, $g_{2\_1}$, $g_{3\_1}$ and at least three slave color values $g_{1\_2}$, $g_{2\_2}$, $g_{3\_2}$ are identified. The color transformations 40 may be a non linear transformation (for example an S-shaped transformation) mapping the at least three slave color values $g_{1\_2}$, $g_{2\_2}$, $g_{3\_2}$ to the at least three master color values $g_{1\_1}$, $g_{2\_1}$, $g_{3\_1}$.

Figure 4:
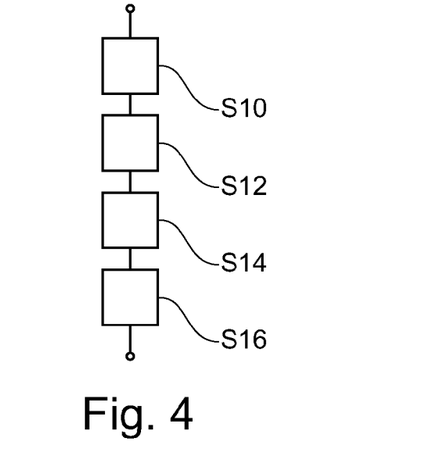
FIG. 4 shows a flow diagram for a method for optically adapting an image according to an embodiment of the invention.

In FIG. 4, a flow diagram for the method for optically adapting the X-ray slave image (34a) to an X-ray master image (34b) is shown.

In step S10, the workstation 22 receives the master image 34a and the slave image 34b, which have been selected by a user, for example with the aid of the user interface 24.

In step S12, the workstation automatically generates the color transformation 40 based on the master image 34a and the slave image 34b, for example as explained with respect to FIGS. 2 and 3.

In step S14, the workstation 22 applies the color transformation 40 to the slave image 34b and generates the transformed image 42.

In step S16, the workstation 22 displays the transformed slave image 42 on the display 20.

The method may be carried out by a processor of the workstation. In particularly, a computer program may be executed by the processor, which is adapted to carry out the method as described in the above and in the following. The computer program may be stored in the workstation 22 or any other computer-readable medium. A computer-readable medium may be a floppy disk, a hard disk, an USB (Universal Serial Bus) storage device, a RAM (Random Access Memory), a ROM (Read Only memory) and an EPROM (Erasable Programmable Read Only Memory). A computer readable medium may also be a data communication network, e.g. the Internet, which allows downloading a program code.

Figure 5A:
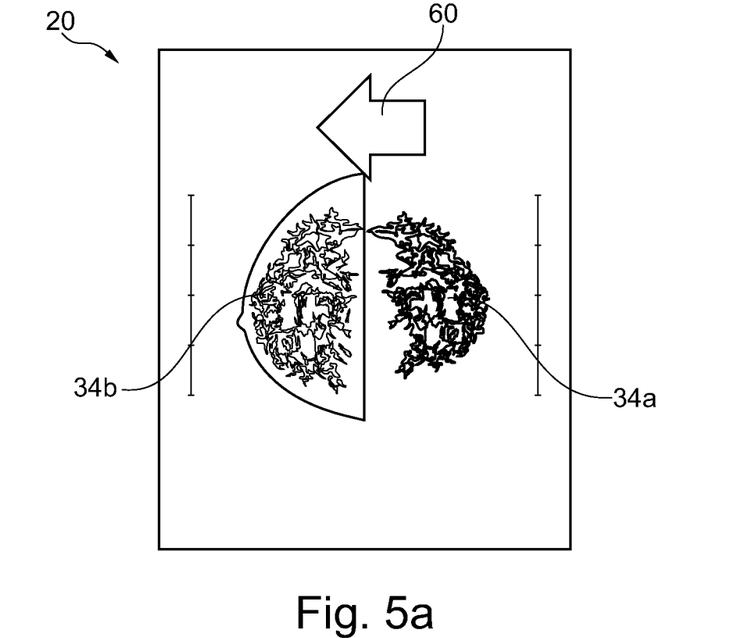
FIG. 5a shows a display showing a master and a slave images according to an embodiment of the invention.

FIG. 5a shows the display 20 displaying a first image 34a and a second image 34b side by side on its screen. The user may select how many images 34a, 34b are displayed on the display and/or which images 34a, 34b, for example from the database 14, are displayed.

On the screen a part of the user interface 22 is shown in the form of a button 60, which may be clicked with a mouse arrow. However, the button 60 may be real switch.

The button 60 may be seen as a "style copy"-button 60 for copy a style from one image 34a to the other image 34b. The button 60 may be only active (and/or) when at least two different images 34a, 34b are displayed.

With the interface 24, the user may define which one of the displayed images is the master image 34a. For example, one image 34a may be defined as master image 34a by defining the direction of an arrow on the button 60 (for example with the mouse arrow).

When the button 60 is pressed or actuated, the workstation 22 executes automatically the above described method and transforms the slave image 34b (or two or more slave images, if more than two images are displayed simultaneously) to the transformed image 42 (or two or more transformed images). The transformed image 42 is then displayed instead of the slave image 34b.

Figure 5B:
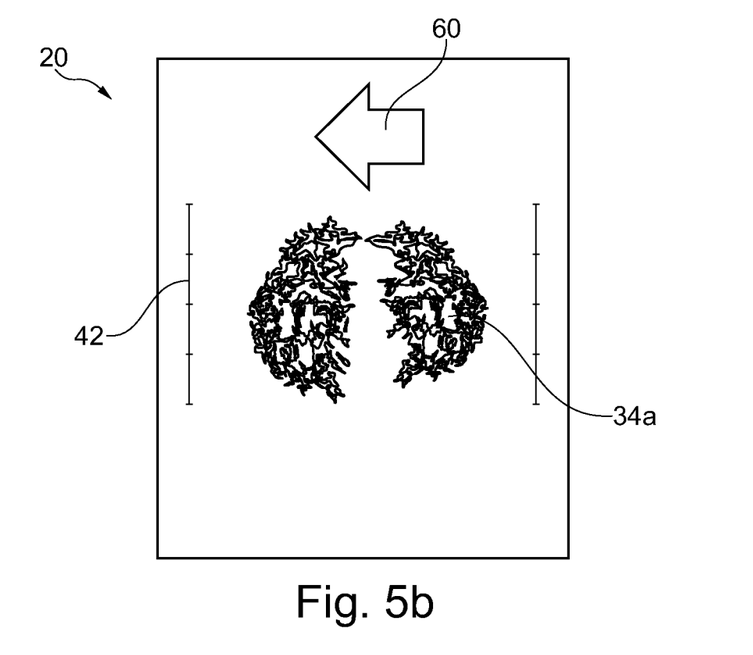
FIG. 5b shows a display showing a master and a transformed slave images according to an embodiment of the invention.

This is shown in FIG. 5b, which shows the display 20 displaying the master image 34a and the transformed slave image 34b side by side.

According to an embodiment of the invention, the display 20 is adapted for displaying the slave image 34b and the master image 34a simultaneously.

Figure 6:
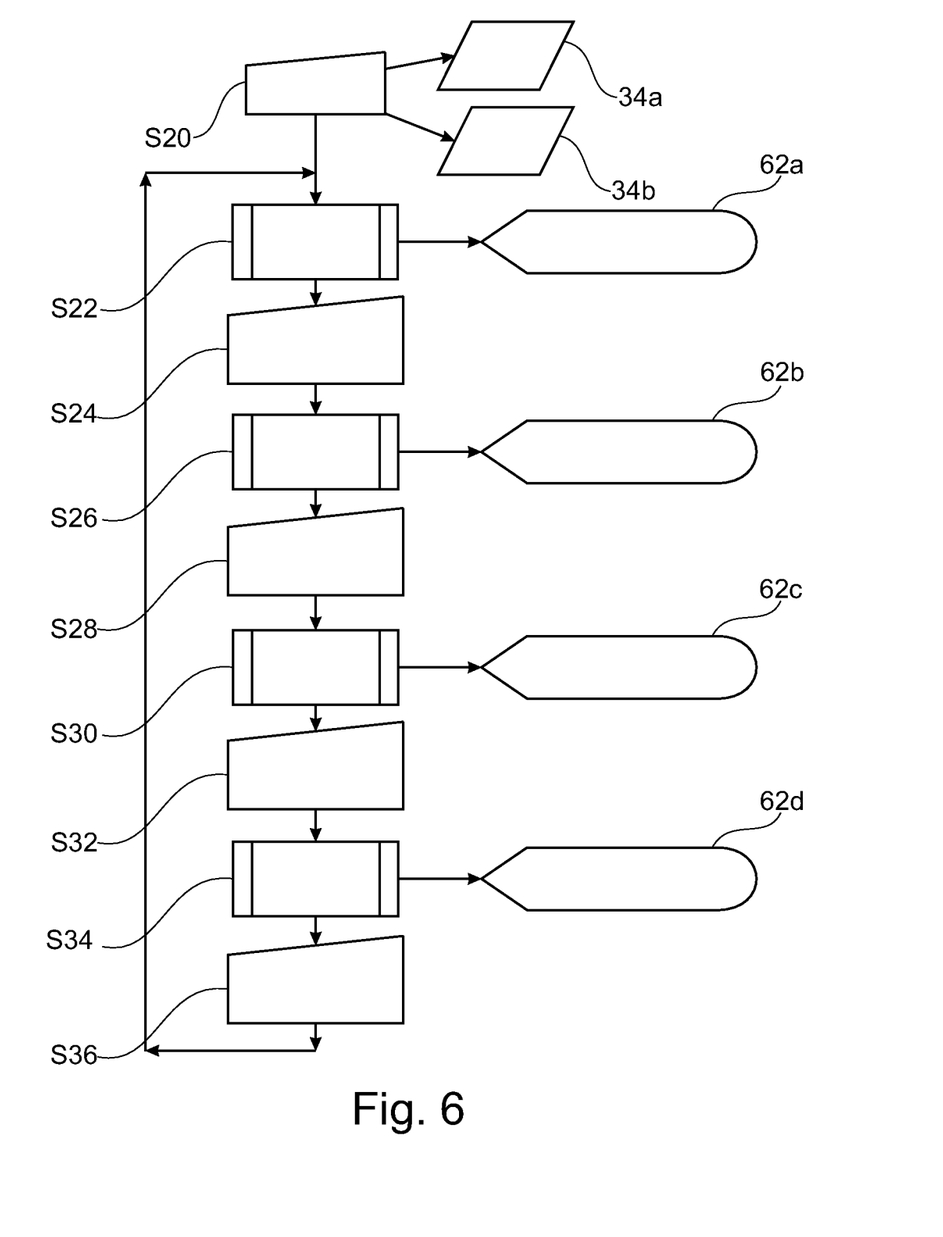
FIG. 6 shows a flow diagram for a method of optically adapting an image according to an embodiment of the invention.

FIG. 6 shows a flow diagram or workflow of how a user may use the device 16 and how different color transformations 40 are calculated and used for transforming a slave image 34b. In particular, the user may press the "style copy"- button 60 repeatedly to get different degrees of image adaption with different color transformations. At the end the image returns to the original version.

For example, the button 60 may toggle between at least three (for example four) states: original view state 62a, linear mapping state 62b, S-shaped mapping state 62c, sophisticated mapping state 62d. In the end, the button 60 toggles back to the first state 62a. So the user has the possibility to select his favorite version of adaptation.

In step S20, the user selects the master image. The workstation 22 sets then the selected image to the master image 34a and the other image to the slave image 34b.

Figure 7A:
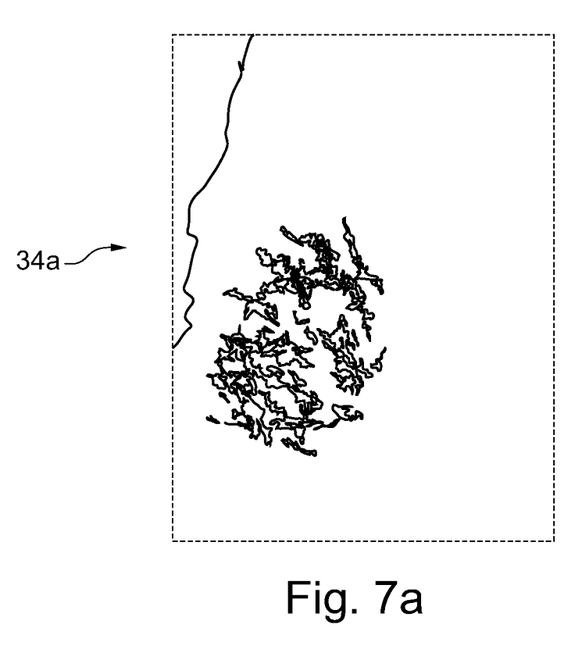
FIG. 7a shows an abstracted master image according to an embodiment of the invention.
Figure 7B:
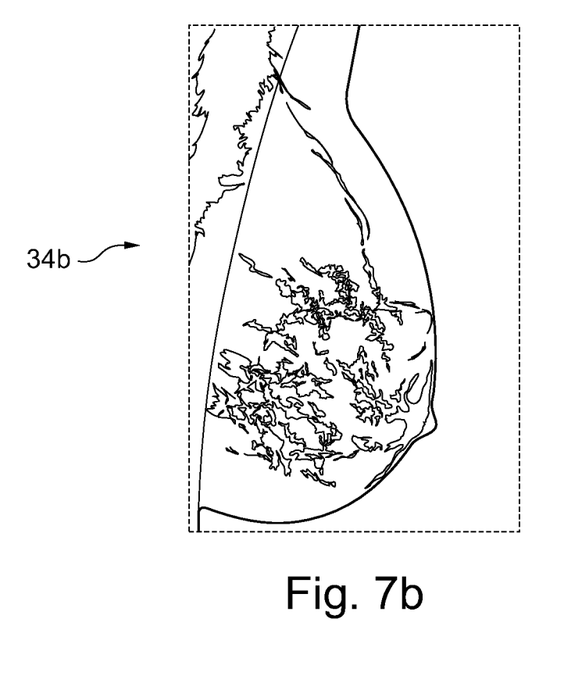
FIG. 7b shows an abstracted original slave image according to an embodiment of the invention.

In Step S22, all changes to the images 34a, 34b may be reset and the button 60 is set to the original view state 62a. The display 20 shows the master image 34a and the (original) slave image 34b), for example as shown in FIG. 5a. In FIG. 7a a master image 34a and in FIG. 7b a slave image 34b that may be displayed are shown.

In step S24, the user may click the button 60.

Figure 7C:
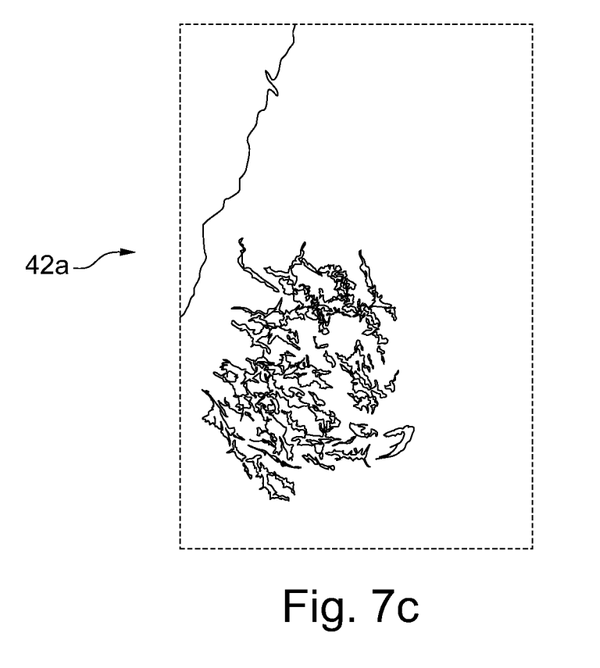
FIG. 7c shows an abstracted linear transformed slave image according to an embodiment of the invention.

In step S26, the button 60 is set to the linear mapping state 62b. The workstation 22 execute the above describe method for transforming the slave image 34a and uses the linear mapping algorithm as explained above. The display 20 then shows the master image 34a and the linear transformed slave image 42a (see FIG. 7c for an example), for example as shown in FIG. 5b.

In step S28, the user may click the button 60 again.

Figure 7D:
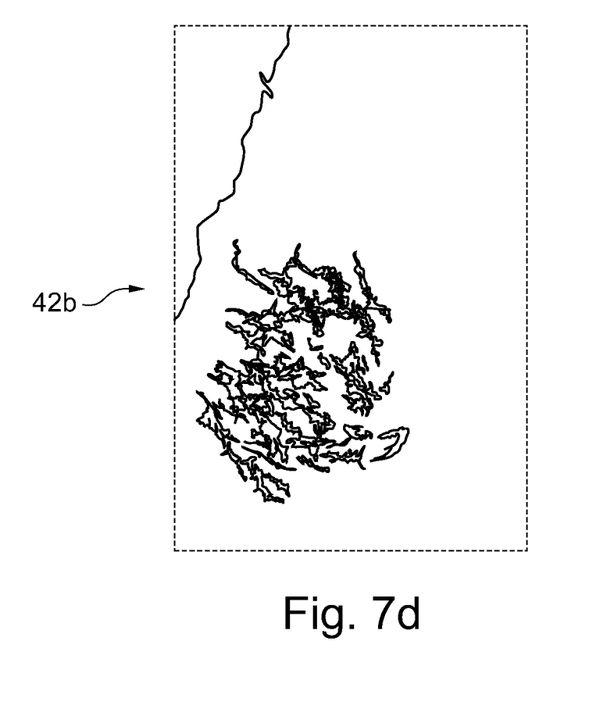
FIG. 7d shows an abstracted S-shaped transformed slave image according to an embodiment of the invention.

In step S30, the button 60 is set to the S-shaped mapping state 62c. The workstation 22 execute the above describe method for transforming the slave image 34a and uses the S-shaped mapping algorithm as explained above. The display 20 then shows the master image 34a and the S-shaped transformed slave image 42b (see FIG. 7d for an example), for example as shown in FIG. 5b.

In step S32, the user may click the button 60 again.

Figure 7E:
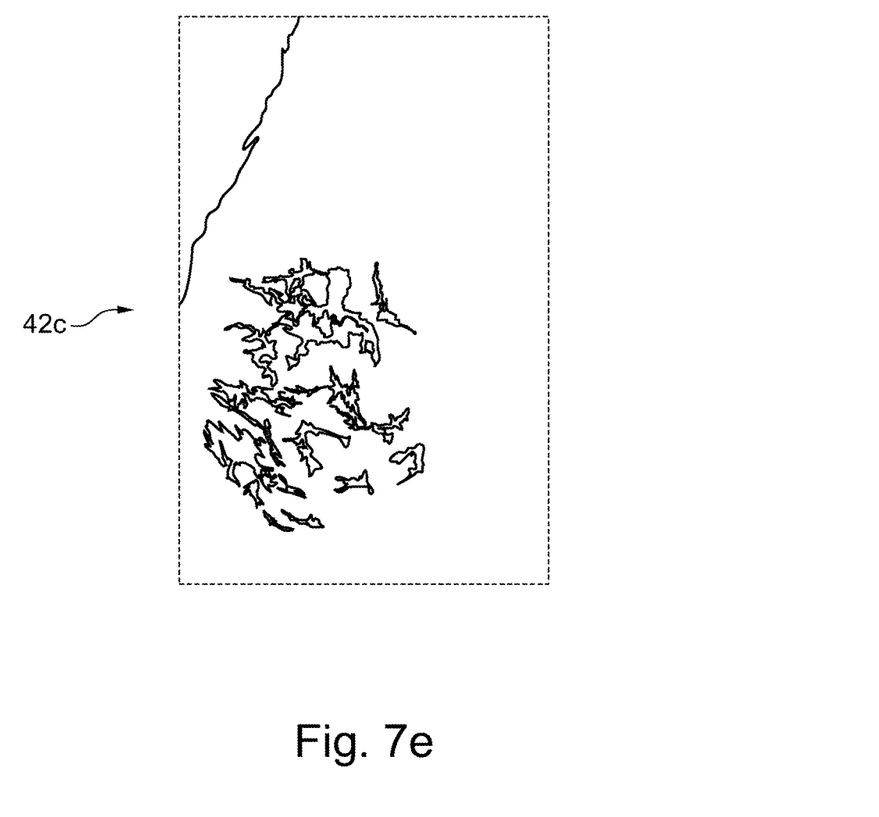
FIG. 7e shows an abstracted sophisticated transformed slave image according to an embodiment of the invention.
Figure 8A:
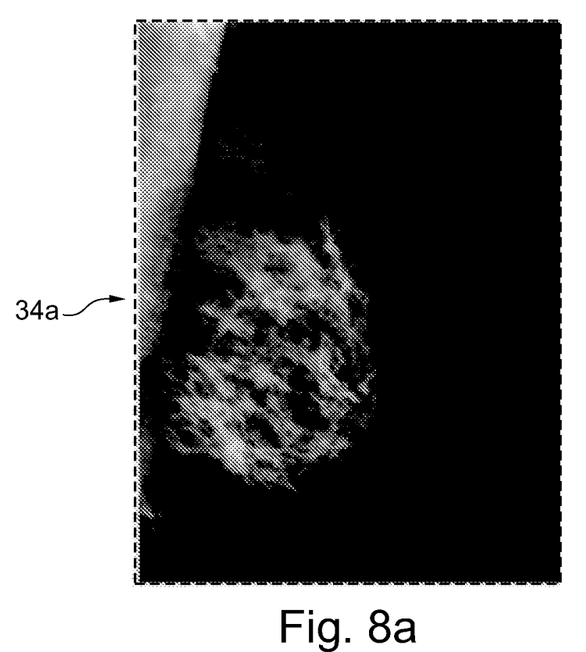
FIG. 8a shows a master image according to an embodiment of the invention.
Figure 8B:
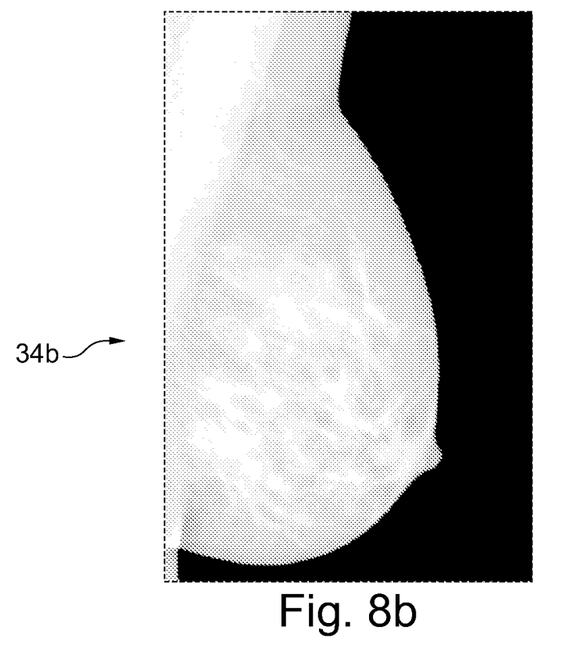
FIG. 8b shows an original slave image according to an embodiment of the invention.
Figure 8C:
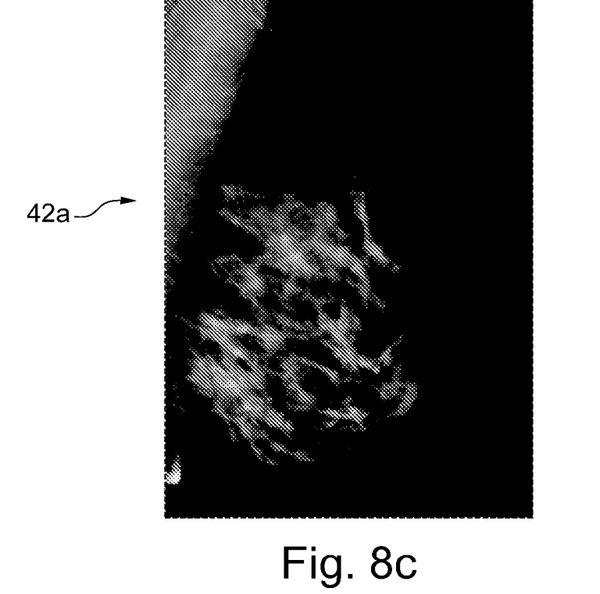
FIG. 8c shows a linear transformed slave image according to an embodiment of the invention.
Figure 8D:
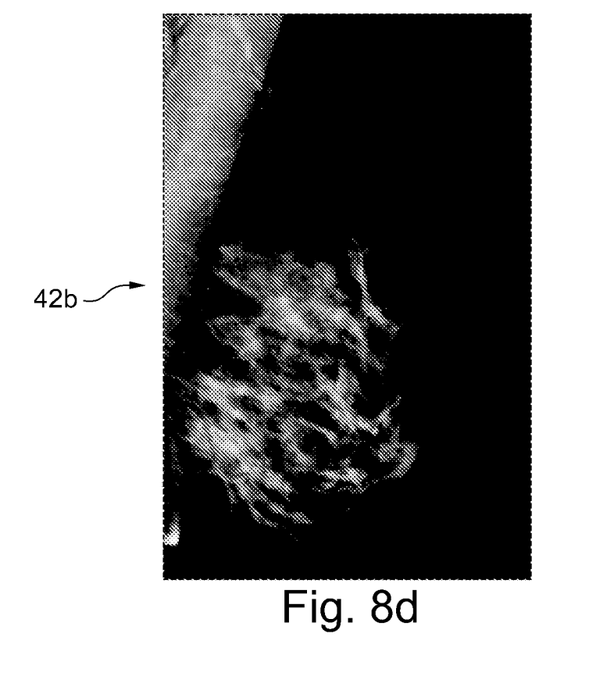
FIG. 8d shows an S-shaped transformed slave image according to an embodiment of the invention.
Figure 8E:
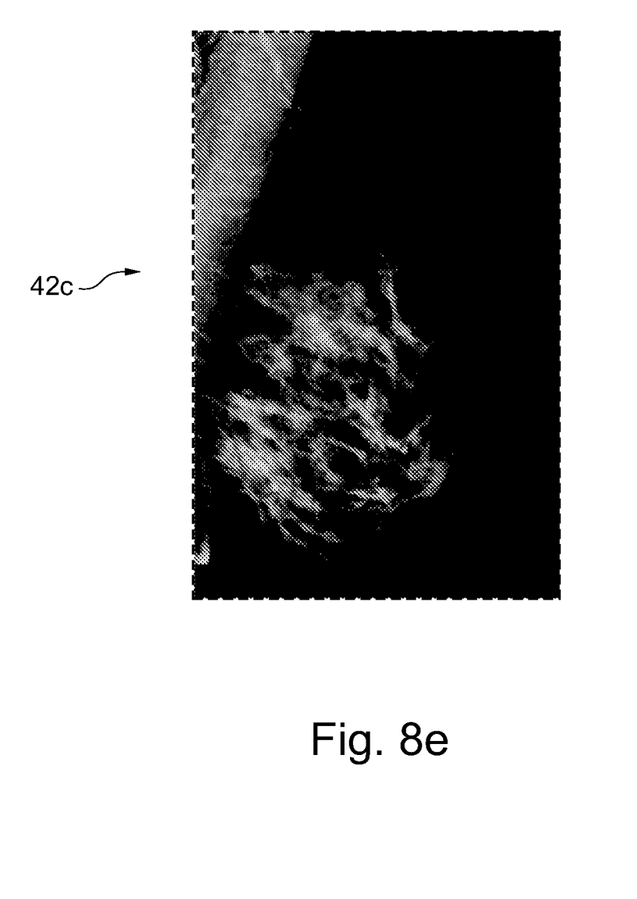
FIG. 8e shows a sophisticated transformed slave image according to an embodiment of the invention.

In step S34, the button 60 is set to the sophisticated mapping state 62d. The workstation 22 execute the above describe method for transforming the slave image 34a and uses the sophisticated mapping algorithm as explained above. The display 20 then shows the master image 34a and the sophisticated transformed slave image 42c (see FIG. 7e for an example), for example as shown in FIG. 5b.

In step S36, the user may click the button 60 again and the workflow continues at step S22.

The FIGS. 7a to 7e have been abstracted to be better printed in black and white. The FIGS. 8a to 8e correspond to 7a to 7e, respectively and are grey scale images.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A device for displaying X-ray images, the device comprising:
   a display for displaying an X-ray image,
   a workstation for processing image data; and
   a user interface for receiving commands from a user of the device,
   wherein the user interface is adapted for allowing the user to select a master image and a slave image from a plurality of images,
   wherein the workstation is adapted from transforming the slave image by:
      generating a color transformation based on the master image and the slave image for optically adapting the slave image to the master image; and
      applying the color transformation to the slave image;
   wherein the display is adapted for displaying the transformed slave image;
   wherein the workstation is adapted for generating at least two types of color transformations;
   wherein the user interface is adapted to allow the user to toggle between the at least two color transformations; and
   wherein the color transformation is a pixel wise transformation.

2. A non-transitory computer-readable medium embodying a computer program for optically adapting an X-ray slave image to an X-ray master image, said program having instructions executable by a processor for performing a plurality of acts, from among said plurality there being the acts of:
   allowing, by a user interface, a user at a workstation to interactively select, from among multiple images already on a display, which is said master image, and which one or more of said multiple images are slave images for optical adapting to said master image, said slave image being from among said slave images,
   automatically generating a color transformation based on the master image and the slave image;
   applying the color transformation to the slave image for optically adapting the slave image to the master image; and
   displaying the transformed slave image on said user interface.

3. The computer-readable medium of claim 2,
   wherein the workstation generates at least two types of color transformations; and
   wherein the user interface is adapted to allow the user to toggle between the at least two color transformations, said color transformation being from among said at least two color transformation.

4. The computer readable medium of claim 2, said multiple images amounting to two images, said one or more amounting to one.

5. The computer readable medium of claim 2, wherein the optical adapting to be performed by the color transformation is to a single image which is said master image.

6. A device form displaying X-ray images, the device comprising:
   a display for displaying an X-ray image,
   a workstation for processing image data; and
   a user interface for receiving commands from a user of the device,
   wherein the user interface is adapted for allowing the user to select a master image and a slave image from a plurality of images,
   wherein the workstation is adapted for transforming the slave image by:
      generating a color transformation based on the master image and the slave image for optically adapting the slave image to the master image, wherein the optical adapting to be performed by the color transformation is to a single image which is said master image; and
      applying the color transformation to the slave image;
   wherein the display is adapted for displaying the transformed slave image,
   wherein the workstation is adapted for generating at least two types of color transformations; and
   wherein the user interface is adapted to allow the user to toggle between the at least two color transformations, said color transformation being from among said at least two color transformations.

7. A method for optically adapting an X-ray slave image to an X-ray master image, the method comprising the steps of:
   receiving the master image and the slave image selected by a user in a workstation;
   automatically generating a color transformation based on the master image and the slave image;
   applying the color transformation to the slave image for optically adapting the slave image to the master image, wherein the optical adapting to be performed by the color transformation is to a single image which is said master image; and
   displaying the transformed slave image on a user interface,
   wherein the workstation generates at least two types of color transformations; and
   wherein the user interface is adapted to allow the user to toggle between the at least two color transformations, said color transformation being from among said at least two color transformations.

8. A device for displaying X-ray images, the device comprising:
   a display for displaying an X-ray image,
   a workstation for processing image data; and
   a user interface for receiving commands from a user of the device,
   wherein the user interface is adapted for allowing the user to select a master image and a slave image from a plurality of images,
   wherein the workstation is adapted for transforming the slave image by:
      generating a color transformation based on the master image and the slave image for optically adapting the slave image to the master image, wherein the optical adapting to be performed by the color transformation is to a single image which is said master image; and
      applying the color transformation to the slave image;
   wherein the display is adapted for displaying the transformed slave image,
   wherein said allowing comprises allowing said user to select, from among said plurality, multiple images for presentation on said display and to then interactively select which, from among said multiple images, is said master image, and which one or more of said multiple images are slave images for optical adapting to said master image, said slave image being from among said slave images.

* * * * *